(12) United States Patent
Santoro et al.

(10) Patent No.: US 10,188,241 B2
(45) Date of Patent: Jan. 29, 2019

(54) DISPENSER ASSEMBLY

(71) Applicant: Vi-Jon, Inc., St. Louis, MO (US)

(72) Inventors: Donna M. Santoro, St. Charles, MO (US); Andy Lee Kirkpatrick, Green Bay, WI (US); Kacey James Kreuter, Green Bay, WI (US); Stephen John Kocis, Suwanee, GA (US); Anthony Toribio, Suwanee, WI (US); William J. Peek, Lawrenceville, GA (US)

(73) Assignee: Vi-Jon, Inc., St. Louis, MO (US)

( * ) Notice: Subject to any disclaimer, the term of this patent is extended or adjusted under 35 U.S.C. 154(b) by 0 days.

(21) Appl. No.: 15/166,714

(22) Filed: May 27, 2016

(65) Prior Publication Data

US 2017/0340173 A1    Nov. 30, 2017

(51) Int. Cl.
*A47K 5/12* (2006.01)

(52) U.S. Cl.
CPC .......... *A47K 5/1217* (2013.01); *A47K 5/1211* (2013.01)

(58) Field of Classification Search
CPC ............................. A47K 5/1217; A47K 5/1211
USPC ....................................................... 222/181.3
See application file for complete search history.

(56) References Cited

U.S. PATENT DOCUMENTS

| 5,445,288 | A | * | 8/1995 | Banks | ................... | B05B 7/0025 |
| | | | | | | 222/105 |
| 6,832,701 | B2 | | 12/2004 | Schiller | | |
| 7,044,328 | B1 | | 5/2006 | Ciavarella | | |
| D607,737 | S | | 1/2010 | MacCarthy | | |
| 8,071,933 | B2 | | 12/2011 | Ophardt et al. | | |
| 2003/0006246 | A1 | * | 1/2003 | Studer | ................. | A47K 5/1209 |
| | | | | | | 222/52 |
| 2009/0212073 | A1 | | 8/2009 | Haworth | | |
| 2011/0132933 | A1 | | 6/2011 | Ophardt et al. | | |
| 2012/0080452 | A1 | | 4/2012 | Boshuizen et al. | | |
| 2013/0292410 | A1 | | 11/2013 | Pelkey et al. | | |
| 2014/0091106 | A1 | | 4/2014 | Ophardt et al. | | |
| 2014/0166677 | A1 | | 6/2014 | Flanagan-Kent et al. | | |
| 2014/0231460 | A1 | | 8/2014 | Pelkey et al. | | |

FOREIGN PATENT DOCUMENTS

WO        0152708 A1    7/2001

OTHER PUBLICATIONS

Extended Search Report regarding European Patent Application No. 17172077.4-1005; dated Jan. 25, 2018; pp. 1-8.

* cited by examiner

*Primary Examiner* — Donnell Long
(74) *Attorney, Agent, or Firm* — Armstrong Teasdale LLP (57) ABSTRACT

A dispenser assembly for dispensing a product is provided herein. The dispenser assembly includes a bottle configured to store the product, the bottle including a back wall. The back wall includes a substantially flat surface, and an angled surface extending outwards from the flat surface. The dispenser assembly further includes a battery holder including a housing, and a plurality of batteries contained in the housing, wherein the battery holder is positioned adjacent the flat surface of back wall of the bottle and below the angled surface of the back wall.

18 Claims, 8 Drawing Sheets

FIG. 7

DISPENSER ASSEMBLY

FIELD

This disclosure generally relates to dispensing a product, and more specifically, to a motion-activated dispenser assembly for dispensing a foam or liquid product for hand hygiene or skin care.

BACKGROUND

Dispensing systems are used to distribute cleaning, sanitizing, and skin care products to a user. For example, in various institutional establishments such as hospitals, schools, restaurants, offices, and restrooms, it is highly desirable to provide dispensing equipment in order to lessen the risk of contamination and control the spread of harmful germs. These dispensing systems may be maintained, for example, in a vertical surface-mounted setting with a refill cartridge of hand sanitizer, liquid soaps, foaming soaps, and/or other skin care products. The designs of various dispensers have a range of complexity which impact ease of use and cost.

Dispensing systems may be motion-activated, such that no physical contact with the dispenser assembly is required in order to have product dispensed, reducing the risk of contamination. Such motion-activated assemblies typically require a power source (e.g., a battery holder) to power motion-sensing and dispensing components thereof. However, a battery holder in the dispensing assembly takes up a relatively large of space, negatively impacting the profile and space-saving efficiency of the dispensing assembly.

This Background section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF SUMMARY

In one aspect, a dispenser assembly for dispensing a product is provided. The dispenser assembly includes a bottle configured to store the product and a battery holder. The bottle includes a back wall, and the back wall includes a substantially flat surface, and an angled surface extending outwards from the flat surface. The battery holder includes a housing, and a plurality of batteries contained in the housing. The battery holder is positioned adjacent the flat surface of back wall of the bottle and below the angled surface of the back wall.

In another aspect, a bottle for a dispenser assembly is provided. The bottle includes a neck portion, a substantially flat top wall, and a body portion extending between the neck portion and the top wall. The body portion includes a front wall, an opposing back wall, and a pair of side walls extending between the front wall and the back wall. The back wall includes a substantially flat surface, wherein the bottle has a first depth between the front wall and the substantially flat surface. The flat surface extends between a first end and a second end. The back wall also includes an angled surface extending outwards from the first end of the flat surface and away from the flat surface. The bottle has a second depth between the front wall and the angled surface, the second depth greater than the first depth.

In a further aspect, a dispenser assembly for dispensing a liquid product is provided. The dispenser assembly includes a bottle configured to store the product, and a battery holder. The bottle includes a back wall, and the back wall includes a substantially flat surface, and an extension portion extending outwards from the flat surface. The battery holder includes a housing, and a plurality of batteries contained in the housing. The battery holder is positioned adjacent the flat surface of back wall of the bottle, and the extension portion extends between adjacent batteries of the plurality of batteries.

In yet another aspect, a dispenser assembly for dispensing a liquid product is provided. The dispenser assembly includes a housing having a first depth, a bottle contained within the housing, and a battery holder contained within the housing. The bottle is configured to store the product. The battery holder includes a housing, and at least one battery. The at least one battery has a second depth, wherein the first depth of the dispenser assembly housing is proportional to the second depth of the at least one battery.

BRIEF DESCRIPTION OF THE DRAWINGS

Like reference symbols in the various drawings indicate like elements.

DETAILED DESCRIPTION

Figure 1:
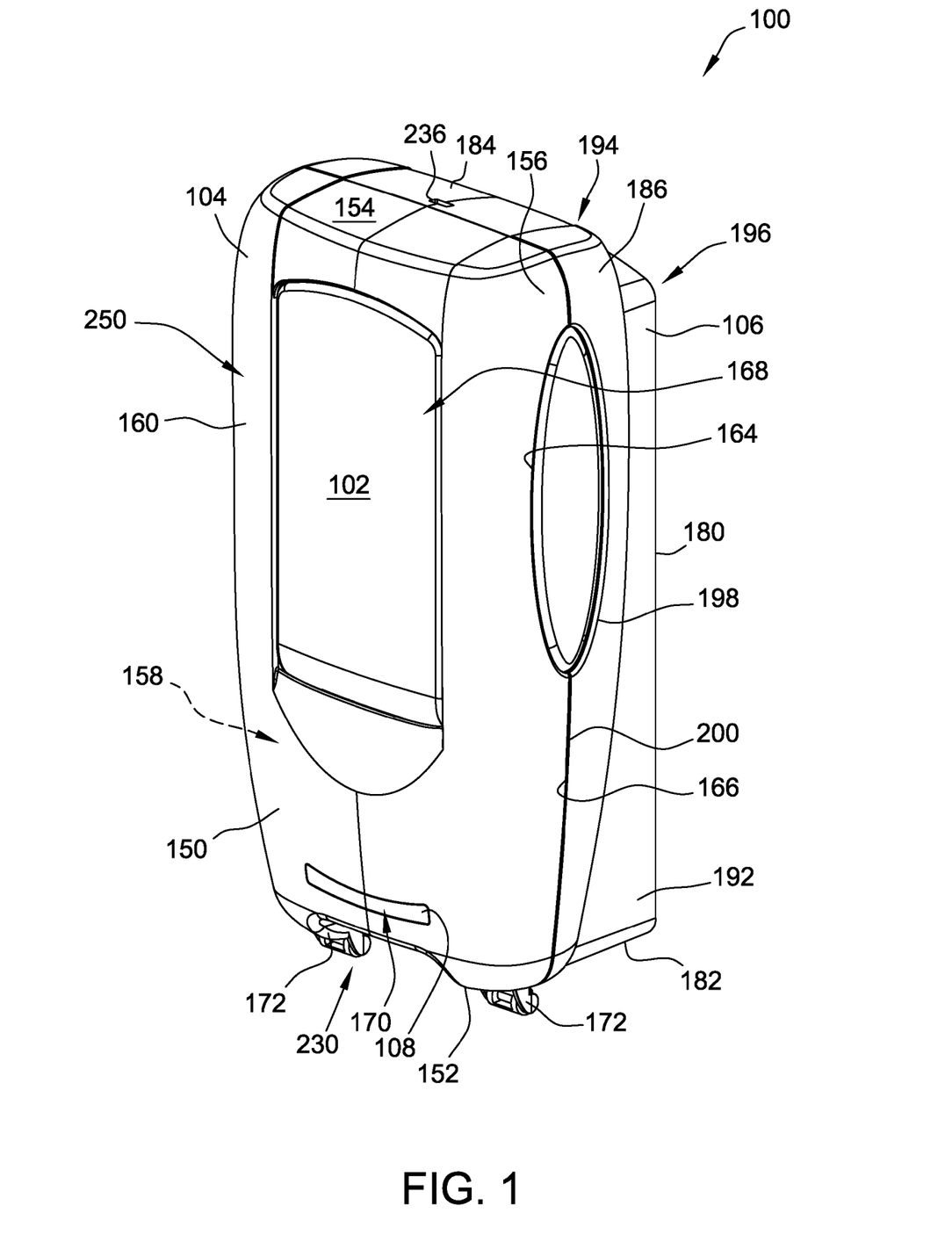
FIG. 1 is a perspective view of a dispenser assembly.
Figure 2:
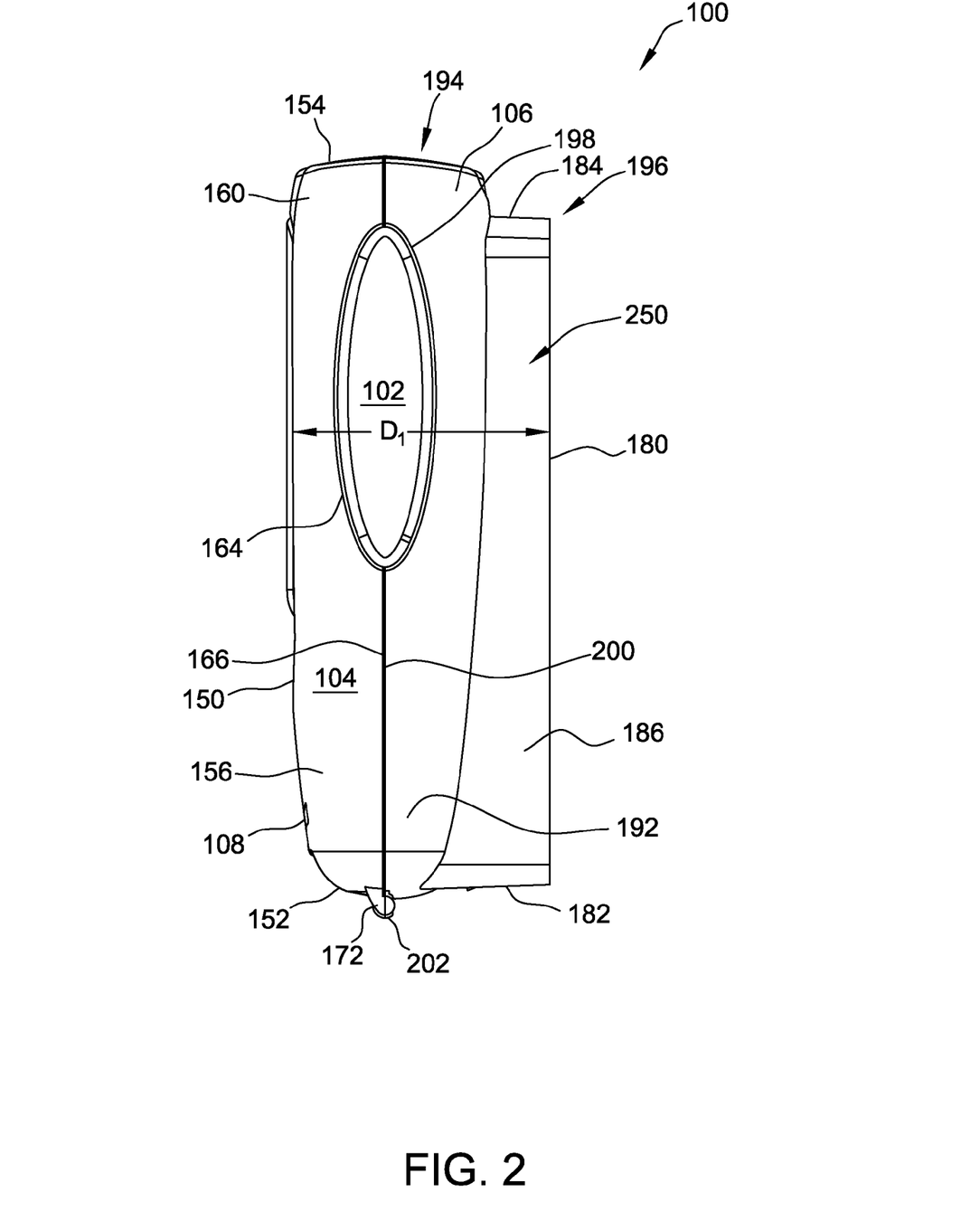
FIG. 2 is a side view of the dispenser assembly shown in FIG. 1.

Referring now to the drawings and in particular to FIGS. 1 and 2, a dispenser assembly, generally indicated at 100, includes a bottle 102, a cover 104, a mounting component 106, an indicator light 108, and a sensing component (not shown). The dispenser assembly 100 is generally configured to dispense a product (not shown) therefrom, in particular a liquid or a foam, such as hand sanitizer, soaps, or other liquid or foam skin care products. The bottle 102 is configured to contain the product (e.g., a liquid product) therein. When a user initiates motion within range of the sensing component of the dispenser assembly 100 (e.g., waving their hand), the dispenser assembly 100 is configured to dispense product therefrom.

Figure 3A:
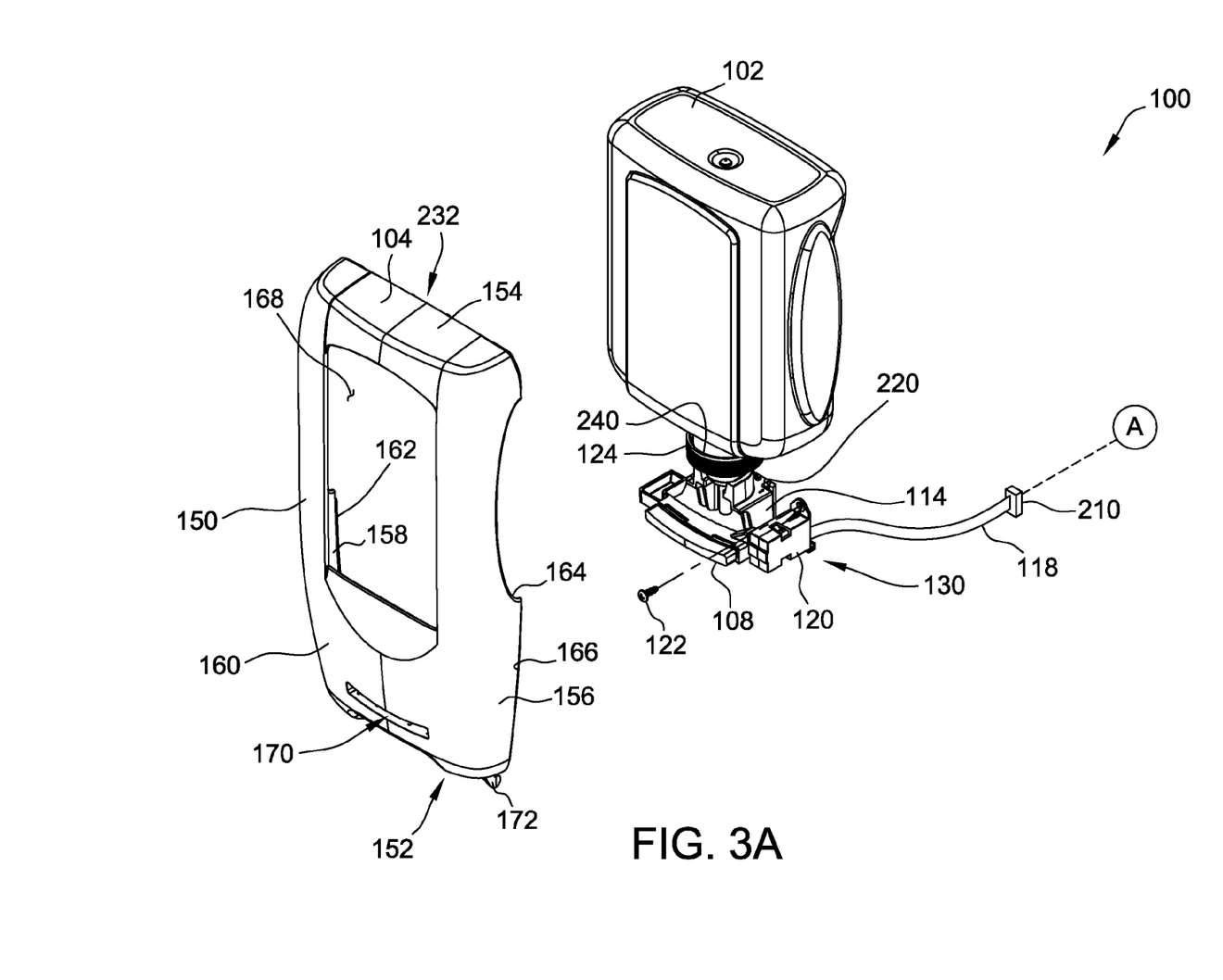
FIGS. 3A and 3B are an exploded view of the dispenser assembly shown in FIG. 1.
Figure 3B:
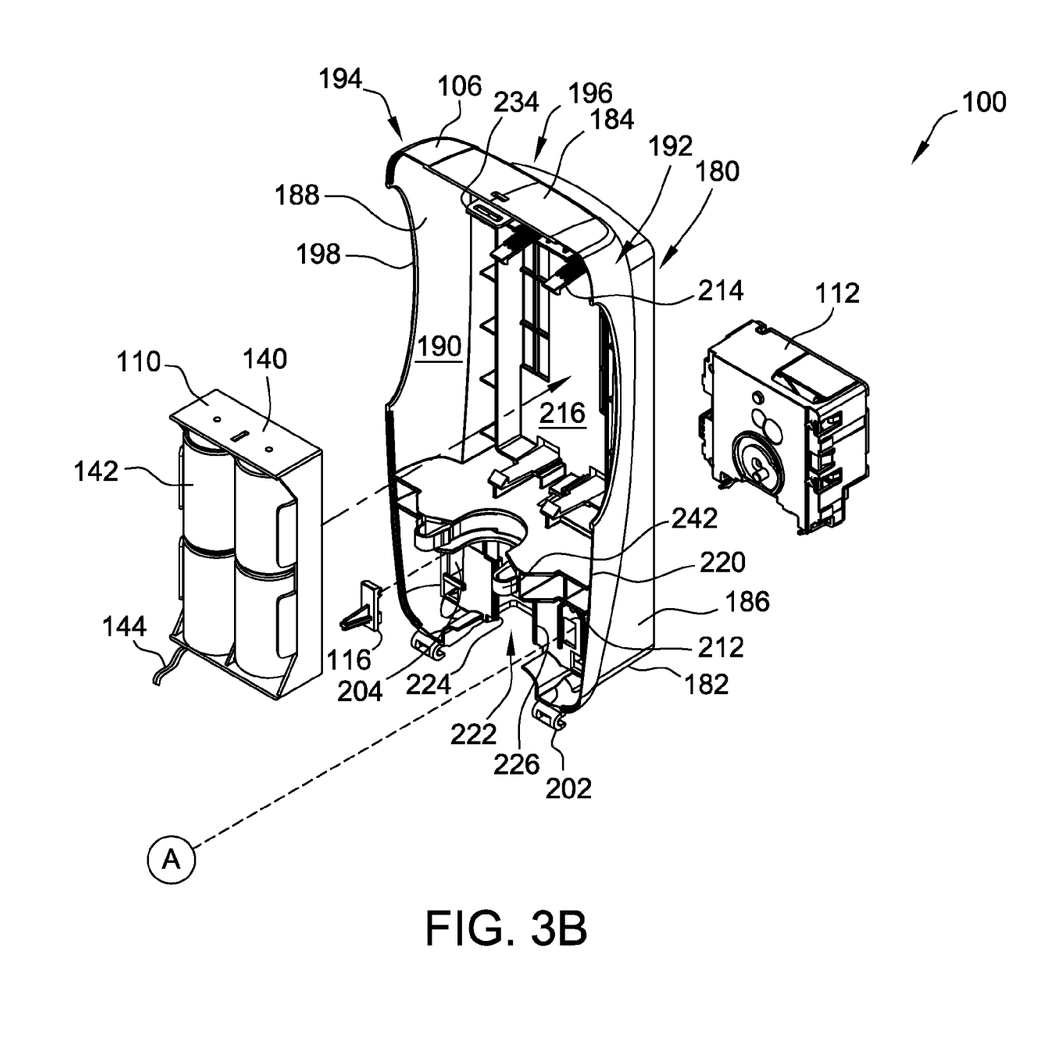

FIGS. 3A and 3B show an exploded view of the dispenser assembly 100 shown in FIGS. 1 and 2. The dashed arrows represent relative movement of the various components to assemble the dispenser assembly 100. With reference to FIGS. 1-3B, the dispenser assembly 100 further includes a battery holder 110, a drive mechanism 112, an actuator 114, a door close switch 116, an LED harness 118, a brace 120, a brace screw 122, and a pump 124. The battery holder 110 includes a housing 140 and, in the illustrated embodiment, four D-cell batteries 142. In other embodiments, fewer, more, and/or different batteries may be included in battery holder 110. The battery holder 110 also includes a power wire 144 coupled to the battery holder 110 to enable the transfer of power from the batteries 142 to the drive mechanism 112.

The cover 104 includes a front wall 150, a bottom wall 152, a top wall 154, and two opposing side walls 156, 158 integrally formed with the front wall 150, the bottom wall 152, and the top wall 154. The walls 150-158 collectively define an exterior surface 160 of the cover 104 and an interior surface 162 of the cover 104. Each side wall 156, 158 includes an arcuate edge 164 and a back edge 166. In the example embodiment, the arcuate edge 164 is configured to be complementary to a shape of a body portion 402 (shown in FIGS. 4 and 5) of the bottle 102. Accordingly, when the dispenser assembly 100 is assembled, at least a portion of the body portion 402 of the bottle 102 may engage the arcuate edge 164 of at least one side wall 156, 158 of the cover 104, such that the bottle 102 is supported within the dispenser assembly 100.

The front wall 150 of the cover 104 includes a bottle window 168 and a light window 170. The bottle window 168 is an opening configured to receive at least a portion of the body portion 402 of the bottle 102. When the dispenser assembly 100 is assembly, that portion of the bottle 102 extends through the bottle window 168 and is visible to a user. The light window 170 is an opening configured to receive the indicator light 108 therein, as described further herein.

The cover 104 further includes hinge components 172 extending outwards from the bottom wall 152. As described further herein, the hinge components 172 of the cover 104 are configured to engage with hinge components 172 of the mounting component 106 to hingedly couple the cover 104 to the mounting component 106.

It should be understood that the cover 104 may have different configurations, shapes, and sizes than those illustrated and described herein without departing from the present disclosure. The cover 104 may be made of any suitable material such as, without limitation, polycarbonate (PC), ABS, or any other plastic, composite plastic, or thermoplastic resin or combination thereof. The cover 104 can be made in any desired color or colors, and may be transparent, translucent, or opaque.

The mounting component 106 includes a back wall 180, a bottom wall 182, a top wall 184, and two opposing side walls 186, 188 integrally formed with the back wall 180, the bottom wall 182, and the top wall 184. The walls 180-188 collectively define an interior face 190 of the mounting component 106 and an exterior surface 192 of the mounting component 106. Moreover, the walls 180-188 also define a front region 194 and a back region 196 of the mounting component 106. In the illustrated embodiment, the front region 194 is longer/taller and wider than the back region 196.

Each side wall 186, 188 includes an arcuate edge 198 and a front edge 200. In the example embodiment, the arcuate edge 198 is configured to be complementary to a shape of the body portion 402 of the bottle 102. Accordingly, when the dispenser assembly 100 is assembled, at least a portion of the body portion 402 of the bottle 102 may engage the arcuate edge 198 of at least one side wall 186, 188 of the mounting component 106, such that the bottle 102 is supported within the dispenser assembly 100.

The back wall 180 of the mounting component 106 may include at least one mounting hole defined therein. The mounting hole is configured to receive a mounting element (not shown) such as, without limitation, a nail head, a screw head, or a hook, upon installation of the dispenser assembly 100, such that the mounting component 106 may be substantially fixed to a wall or other support structure (not shown). The back wall 180 may additionally or alternatively include at least one mounting panel (not shown), which is configured to receive an adhesive element (not shown), such as, for example, a mounting tape, to further secure the mounting component 106 (and, thereby, the dispenser assembly 100) to the wall or other support structure.

The mounting component 106 further includes hinge components 202. Each hinge component 202 is configured to receive a corresponding hinge component 172 of the cover 104. During refill of the dispenser assembly 100, the cover 104 may remain coupled to the mounting component 106 via the engaged hinge components 172, 202.

It should be understood that the mounting component 106 may have different configurations, shapes, and sizes than those illustrated and described herein without departing from the present disclosure. The mounting component 106 may be made of any suitable material such as, without limitation, acrylonitrile-butadiene-styrene (ABS), or any other plastic, composite plastic, or thermoplastic resin. The mounting component 106 can be made in any desired color or colors, and may be transparent, translucent, or opaque.

In the illustrated embodiment, to assemble the dispenser assembly 100, several steps are performed. It should be understood that, in various embodiments, steps of assembly may be performed in various orders. Accordingly, the order of steps provided herein should not be construed to be limiting.

The LED harness 118 is coupled to the brace 120 to form an LED sub-assembly 130. In one embodiment, the LED harness 118 is "snap-fit" into the brace 120, although the LED harness 118 may be coupled to the brace 120 using any suitable coupling or joining method. The indicator light 108 is coupled to the cover 104. In one embodiment, the indicator light 108 is "snap-fit" into the cover 104. More particularly, the indicator light 108 is inserted into the light window 170, from the interior surface 162 of the cover 104 towards the exterior surface 160 of the cover 104. In other embodiments, the indicator light 108 may be coupled to the cover 104 using any suitable coupling or joining method (e.g., adhesives, fasteners, friction fit, etc.). In the illustrated embodiment, the indicator light 108 and the cover 104 are suitably configured such that, when the indicator light 108 is inserted through the light window 170, the indicator light 108 and the cover 104 define a substantially continuous outer front surface. The indicator light 108 may include, for example, an LED light bar, fluorescent light, and/or any other suitable lighting component. In one example embodiment, the indicator light 108 activates (i.e., lights up) when the dispenser assembly 100 is activated to dispense product therefrom. The indicator light 108 lights up in one color, for example, green, to indicate that the dispenser assembly 100 is functioning properly. The indicator light 108 light up another color, for example, red, to indicate that the dispenser assembly 100 is not functioning properly (e.g., the batteries 142 are low).

The door close switch 116 is coupled to the mounting component 106. More specifically, in one embodiment, the door close switch 116 is "snap fit" into a seat 204 in the mounting component 106. In other embodiments, the door close switch 116 may be coupled to the mounting component 106 using any suitable coupling or joining method. The door close switch 116 is configured to activate the indicator light 108, the drive mechanism 112, and/or the sensing component only when the cover 104 is closed.

The LED sub-assembly 130 is then coupled to the mounting component 106. In one embodiment, a distal end 210 of the LED harness 118 is threaded through an opening 212 in the mounting component 106, from the interior surface 190 of the mounting component 106 towards the exterior surface 192 of the mounting component 106. The LED harness 118 is drawn through the opening 212 until the brace 120 is seated against the interior surface 190 of the mounting component 106. The brace screw 122 is then threaded through a screw hole in the brace 120, and through a complementary screw hole in the mounting component 106. The brace screw 122 is tightened to secure the brace 120 to the mounting component 106.

In one embodiment, the battery holder 110 is coupled to the mounting component 106 when the battery holder 110 is devoid of batteries 142. In particular, in one embodiment, a distal end (not shown) of the power wire 144 is threaded through an opening in the mounting component 106, from the interior surface 190 of the mounting component 106 towards the exterior surface 192 of the mounting component 106. The housing 140 of the battery holder 110 is then coupled to the mounting component 106. In particular, in the illustrated embodiment, a plurality of tabs 214 extend outwards from the interior surface 190 of the mounting component 106. The plurality of tabs 214 generally define a battery holder recess 216. The housing 140 of the battery holder 110 engages with the plurality of tabs 214 in a "snap-fit" to couple the housing 140 to the mounting component 106. It should be understood that the housing 140 of the battery holder 110 may be coupled to the mounting component 106 using any other suitable coupling or joining method.

The distal end of the power wire 144 is electrically coupled to the drive mechanism 112 to provide power thereto. The distal end 210 of the LED harness 118 is also electrically coupled to the drive mechanism 112, to provide power to the LED harness 118.

The actuator 114 is coupled to the mounting component 106. In the illustrated embodiment, the actuator 114 includes a pair of opposing grooves 220. The mounting component 106 includes a recess 222 in the bottom wall 182 thereof. The mounting component 106 also includes a cutout 224 in the back wall 180 thereof. The cutout 224 is bounded by two opposing tongues 226. The actuator 114 is coupled to the mounting component 106 by inserting the actuator 114 through the recess 222, aligning the tongues 226 with the grooves 220, engaging the tongues 226 in the grooves 220, and sliding the actuator 114 into the cutout 224.

The drive mechanism 112 is then coupled to the mounting component 106. In the illustrated embodiment, the drive mechanism 112 is "snap-fit" into a recess (not shown) in the exterior surface 192 of the mounting component. It should be understood that the drive mechanism 112 may be coupled to the mounting component 106 using any other suitable coupling or joining method. In some embodiments, a buffer material (not shown) is inserting into the recess of the mounting component 106 adjacent the drive mechanism 112. The buffer material is configured to contain the power wire 144 of the battery holder 110, as well as to deaden sounds generated during operation of the drive mechanism 112. The buffer material may be fabricated from foam or any other suitable material.

The cover 104 is then coupled to the mounting component 106. In the illustrated embodiment, hinge components 172 of the cover 104 engage with hinge components 202 of the mounting component 106 to hingedly couple the cover 104 to the mounting component 106. The coupled hinge components 172, 202 may be generally referred to as hinges 230. In other embodiments, the cover 104 may be otherwise coupled to mounting component 106 (e.g., using fasteners).

The mounting component 106 may then be installed at the desired location. For example, the mounting component 106 may be fastened, adhered, and/or otherwise coupled to a wall or other surface. The cover 104 may be closed by rotating the cover 104 about the hinges 230 until the cover 104 engages with the mounting component 106. In the illustrated embodiment, the cover 104 and the mounting component 106 include complementary locking components 232, 234 configured to lock the cover 104 to the mounting component 106 when the cover 104 is closed. The mounting component 106 further includes a key slot 236 configured to receive any suitable key or other unlocking tool therein, to unlock the cover 104 from the mounting component 106 and open the dispenser assembly 100.

The batteries 142 are installed in the battery holder 110. In some embodiments, the batteries 142 include D-cell batteries. In other embodiments, the batteries 142 include any other size and/or configuration of batteries.

The bottle 102 is filled with the selected product. The pump 124 is coupled to the bottle 102 to seal the bottle 102 and to contain the product therein. The bottle 102 and the pump 124 together form a bottle sub-assembly. The bottle sub-assembly is coupled to the mounting component 106. In the illustrated embodiment, a collar 240 of the pump 124 is "snap-fit" between a pair of opposing tabs 242 extending from the interior surface 190 of the mounting component 106. In other embodiments, the bottle sub-assembly may be coupled to the mounting component 106 and/or the cover 104 using any other suitable coupling or joining method.

When the cover 104 is closed and fully engaged with the mounting component 106, such that the dispenser assembly 100 is fully formed, the cover 104 and the mounting component 106 together define a "housing" 250 of the dispenser assembly 100. The housing 250 has a substantially regular profile or depth $D_1$, taken from a "furthest front" face of the exterior surface 160 of the cover 104 (e.g., a "front face" of the housing 250) to a "furthest back" face of the exterior surface 192 of the mounting component 106 (e.g., a "back face" of the housing 250). By designing the bottle 102, as described herein, to accommodate the battery holder 110 within the housing 250, a slim, regular profile of the housing 250 is maintained, without overly sacrificing a volume of product in the bottle 102.

Although not specifically shown, the sensing component of the dispenser assembly 100 is located, in some embodiments, generally adjacent a bottom of the dispenser assembly 100, such that the sensing component may be activated by a user moving their hand under the dispenser assembly 100. When the user activates the sensing component, the sensing component transmits a signal to the drive mechanism 112. The drive mechanism 112 drives the actuator 114 upwards. The actuator 114 depresses the pump 124 (in the upward direction), which causes the pump 124 to dispense product therefrom, for example, into a hand of the user.

Figure 4:
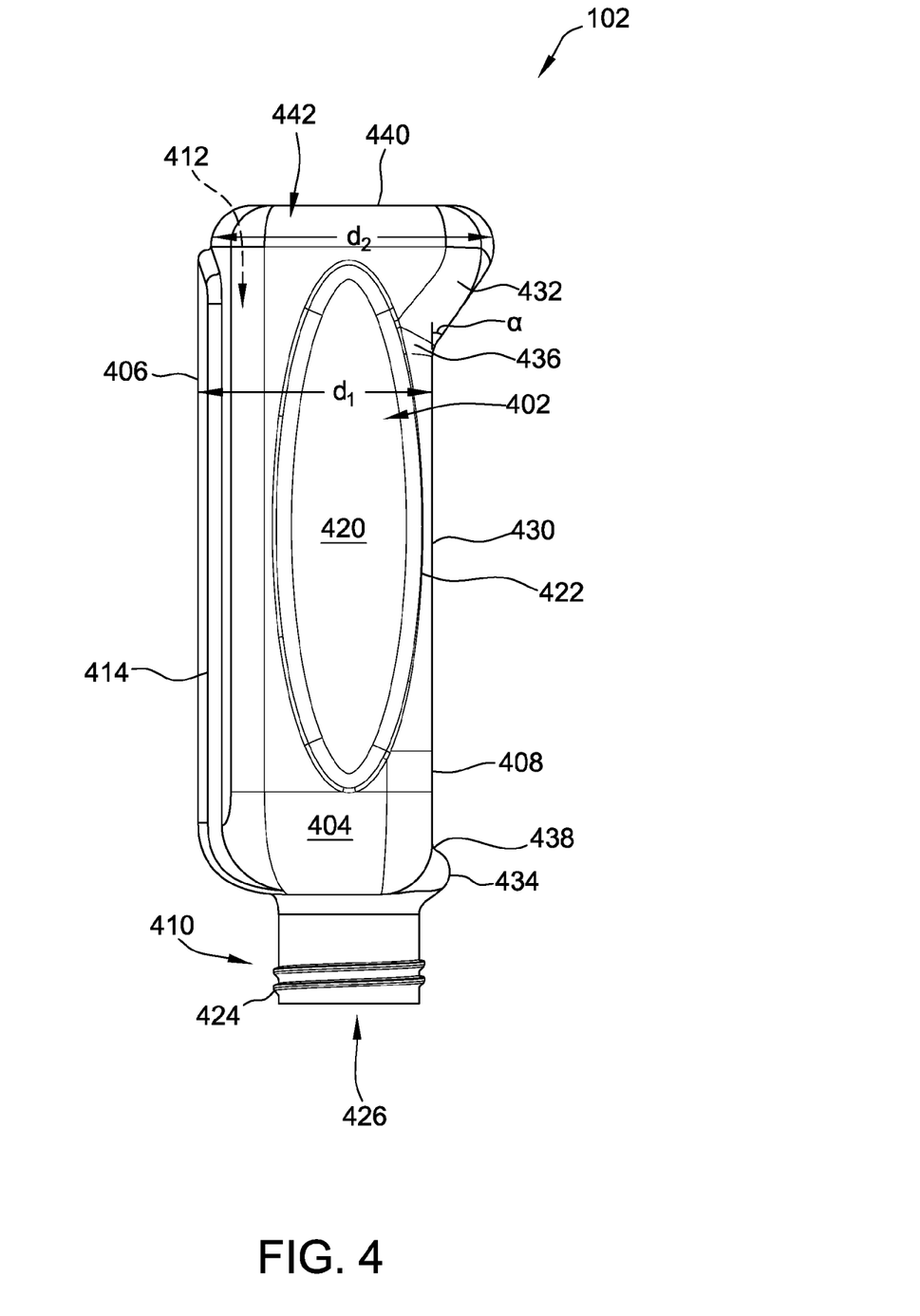
FIG. 4 is a side view of a bottle that may be used with the dispenser assembly shown in FIGS. 1-3B.
Figure 5:
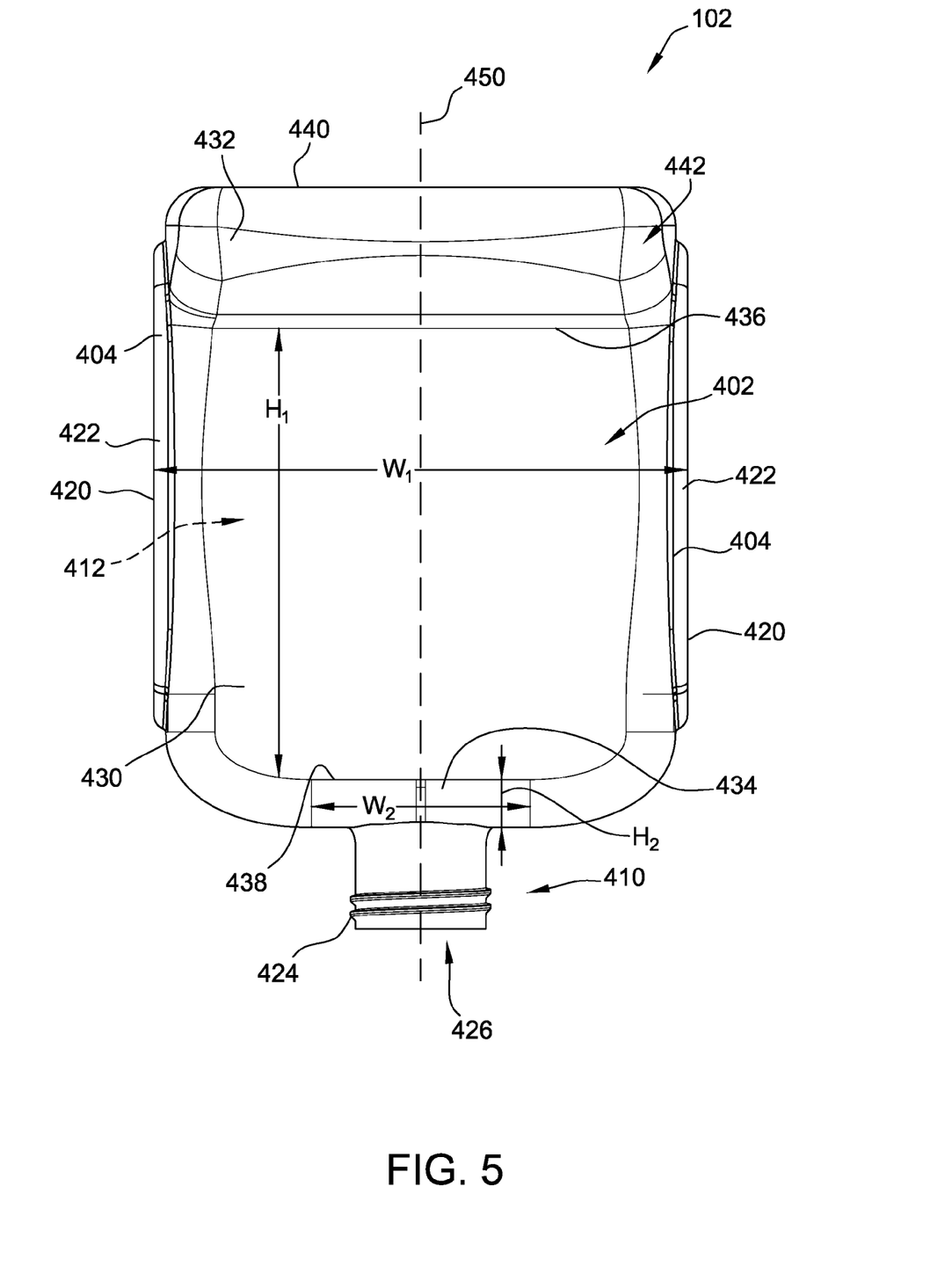
FIG. 5 is a back view of the bottle shown in FIG. 4.

FIGS. 4 and 5 are various views of the bottle 102 of the dispenser assembly 100 shown in FIG. 1. More particularly, FIG. 4 is a side view of the bottle 102, and FIG. 5 is a back view of the bottle 102. The bottle 102 generally includes a body portion 402, including opposing side walls 404, a front wall 406, a back wall 408, and a neck portion 410. The body portion 402 further includes a liquid chamber or cavity 412 defined therein and adapted to hold a quantity of product.

The body portion 402 further includes a bulge 414 defined thereon, such that the cover 104 (shown in FIGS. 1-3B) may engage the body portion 402 of the bottle 102. The bulge 414 extends through the bottle window 168 of the cover 104 when the dispenser assembly 100 is assembled. In the illustrated embodiment, the bulge 414 has a depth substantially equal to a depth of the front wall 150 of the cover 104, such that, when the bulge 414 extends through the bottle window 168, the bottle 102 and the cover 104 define a substantially continuous front surface.

The body portion 402 of the bottle 102 also includes an outwardly projecting rim 420 on opposing side walls 404 of the bottle 102. The outwardly projecting rim 420 includes a generally elliptical edge 422. When the dispenser assembly 100, including the bottle 102, is assembled, each generally elliptical edge 422 engages with a corresponding and complementary arcuate edge 164, 198 of the cover 104 and the mounting component 106, respectively (all shown in in FIGS. 1-3B).

The neck portion 410 includes threads 424 disposed thereon. The neck portion 410 generally defines an opening 426 to the bottle 102 from which product may be dispensed. The neck portion 410 is configured to engage with the pump 124 (shown in FIG. 3A) to couple the pump 124 to the bottle 102, in particular, by engaging the threads 424 of the bottle 102 with internal threads (not shown) of the collar 240 (also shown in FIG. 3A) of the pump 124.

The back wall 408 generally includes a substantially flat surface 430, an angled surface 432, and an extension portion 434. The flat surface 430 extends from a first end 436 to a second end 438. The flat surface 430 has a length or height $H_1$, taken from the first end 436 to the second end 438, a width $W_1$, taken generally between side walls 404. The bottle 102 has a first depth $d_1$ taken from the front wall 406 to the flat surface 430 of the back wall 408.

The angled surface 432 extends outwards (i.e., away from the cavity 412) from the back wall 408. More particularly, the angled surface 432 extends outwardly and upwardly (with respect to the orientation of the bottle 102 shown in FIGS. 4 and 5) from the first end 436 of the flat surface 430 to a top wall 440 of the bottle 102. The bottle 102 has a second depth $d_2$ taken from the front wall 406 to the angled surface 432 of the back wall 408. Although the second depth $d_2$ varies, the second depth $d_2$ is consistently greater than the first depth $d_1$. The angled surface 432 may extend at outwardly at any angle α relative to a plane defined by the flat surface 430. In the illustrated embodiment, the angled surface 432 extends about 45° from this plane. It should be understood that the greater the angle α of the angled surface 432, the greater the second depth $d_2$ (and the greater a volume of the bottle 102 in a top region 442 associated with the angled surface 432).

The extension portion 434 extends outwards (i.e., away from the cavity 412) from the back wall 408. More particularly, the extension portion 434 extends outwardly from the second end 438 of the flat surface 430, opposite the angled surface 432. In the illustrated embodiment, the extension portion 434 has a width $W_2$ less than the width $W_1$ of the flat surface 430, and length or height $H_2$ less than the height $H_1$ of the flat surface 430. In other words, the extension portion 434 is relatively small, compared to other features of the back wall 408 of the bottle 102. Moreover, in the illustrated embodiment, the extension portion 434 extends from the back wall 408 in a position corresponding to a longitudinal centerline 450 of the bottle 102. In alternative embodiments, the extension portion 434 may have any other size, placement, and/or configuration. For example, in one alternative embodiment, the extension portion 434 extends from the flat surface 430 along the longitudinal centerline 450, from the first end 436 to the second end 438 thereof (e.g., as a "ridge" along the longitudinal centerline 450). In one alternative embodiment, the bottle 102 does not include an extension portion 434. As described further herein, the extension portion 434 is suitably sized, shaped, and oriented to extend between adjacent batteries 142 of the battery holder 110.

In this embodiment, the bottle 102 also includes the top wall 440 that is, as best seen in FIG. 4, substantially flat. By including the flat top 440, the bottle 102 is configured to be converted or easily inverted, e.g., from an upside-down position (i.e., with the opening 426 facing downwards) to a right-side-up position (i.e., with the opening 426 facing upwards), such that the bottle 102 may also be used as a stand-alone bottle 102 for containing a liquid product. Accordingly, the complete dispenser assembly 100 may be installed on, for example, a wall, and a stand-alone bottle 102 may be placed on, for example, a sink vanity, with the design aesthetic of the two dispensers (i.e., the dispenser assembly 100 and the bottle 102) unified. The bottle 102 may also include indicia disposed thereon (not shown) for branding purposes, description of the product contained therein, or any other purpose.

It should be understood that the bottle 102 may have different configurations, shapes, and sizes than those illustrated and described herein without departing from the present disclosure. The bottle 102 may be made of any suitable material such as, without limitation, polyethylene terephthalate (PET) or any other plastic or thermoplastic resin. The bottle 102 can be made in any desired color or colors, and may be transparent, translucent, or opaque.

Figure 6:
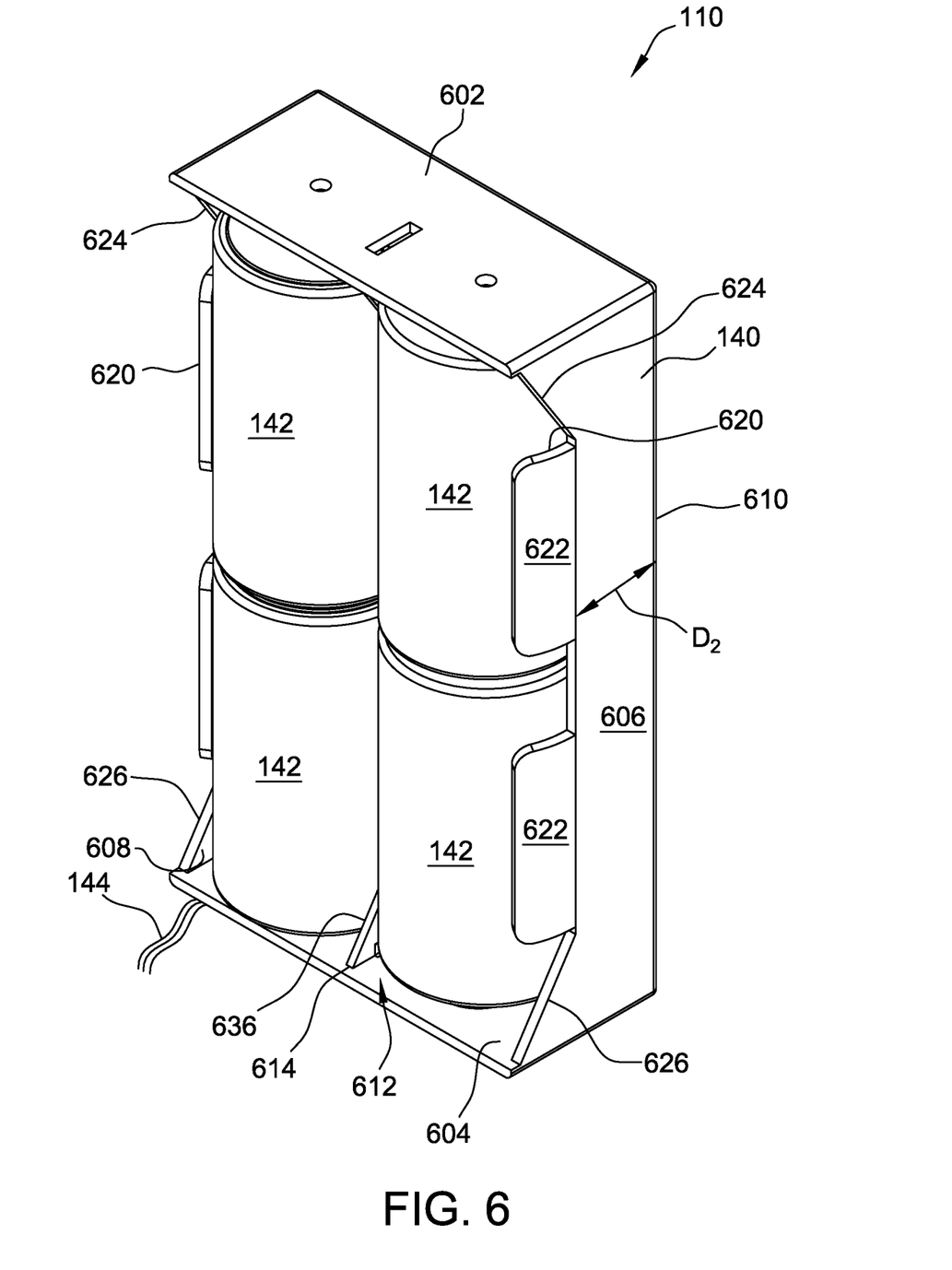
FIG. 6 is a perspective view of a battery holder that may be used with the dispenser assembly shown in FIGS. 1-3B.

FIG. 6 is a perspective view of the battery holder 110 (shown in FIG. 3B). The battery holder 110 includes the housing 140 as well as batteries 142. In the illustrated embodiment, the housing 140 is generally rectangular in shape and includes a top wall 602, a bottom wall 604, opposing side walls 606, 608, and a back wall 610. The top wall 602, the bottom wall 604, the side walls 606, 608, and the back wall 610 together define a housing cavity 612 configured to receives the batteries 142 therein. In addition, the housing 140 includes an intermediate wall 614. In the example embodiment, the intermediate wall 614 separates laterally adjacent batteries 142.

In the illustrated embodiment, each side wall 606, 608 includes a free edge 620. Each free edge 620 includes at least one battery tab 622. The battery tabs 622 are configured to retain the batteries 142 within the housing 140. Moreover, each free edge 620 includes an angled portion 624 extending from the top wall 602 and an angled portion 626 extending from the bottom wall 604. The intermediate wall 614 also includes a free edge 630 (see FIG. 7), which includes angled portions 634, 636 similar to the angled portions 624, 626. The angled portions 624, 626, 634, 636 extend inwards (i.e., towards the back wall 610), reducing a depth $D_2$ of the side walls 606, 608 and the intermediate wall 614.

Figure 7:
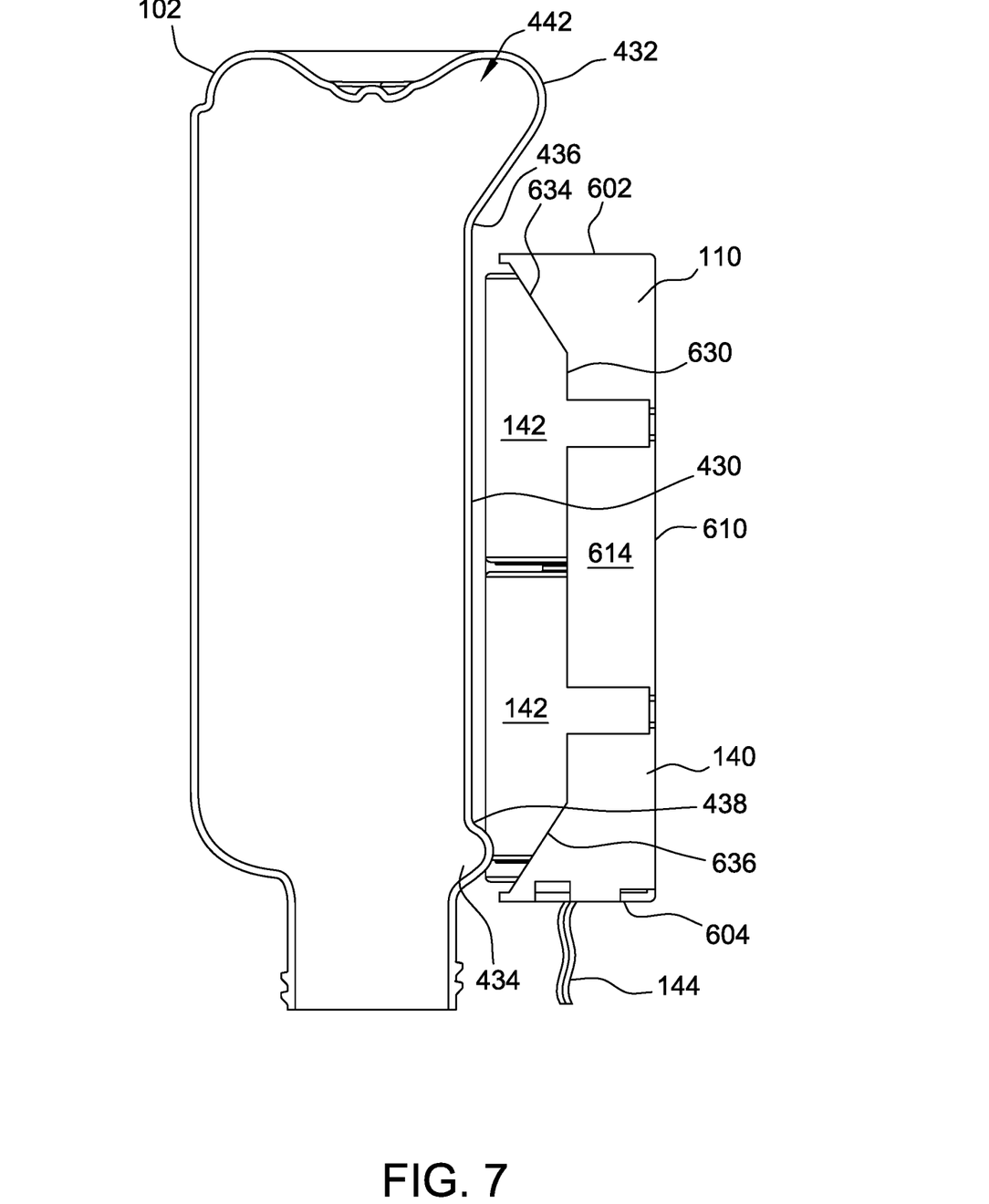
FIG. 7 is a cross-sectional side view of the bottle shown in FIGS. 4 and 5 and the battery holder shown in FIG. 6.

FIG. 7 is a cross-sectional view of the bottle 102 (shown in FIGS. 1-5) and the battery holder 110 (shown in FIGS. 3B and 6). As illustrated, the battery holder 110 and the extension portion 434 of the bottle 102 cooperate such that the extension portion 434 extends between adjacent (e.g., laterally adjacent) batteries 142. The angled portion 636 of the intermediate wall 614 of the housing 142, in particular, accommodates the extension portion 434. Moreover, as illustrated, the design of the bottle 102 facilitates placing the battery holder 110 behind the bottle 102 and beneath the angled surface 432 within the dispenser assembly 100. Such complementary designs of the bottle 102 and the battery holder 110 facilitate providing the dispenser assembly 100 with a reduced profile, compared to other dispenser assemblies (not shown), in which the battery holder is placed above a bottle or behind a typical bottle, which enlarges the dispenser assembly.

Embodiments of the disclosure may provide advantages such as, for example, a bottle and battery holder design that minimize a depth or profile of a dispenser assembly without reducing a volume of product contained therein. Providing a dispenser assembly with a minimal profile improves the usability of the dispenser assembly, as it can be installed in a variety of locations, promoting ease of access and hand hygiene compliance. The minimal design described herein also enhances the aesthetic appeal of the dispenser assembly. The disclosure provides a relatively slim, motion-activated dispenser assembly that features a battery holder and a bottle including a shape complementary to the battery holder. The bottle may be used in an upright or inverted orientation. The design of the bottle facilitates maintaining the slim profile of the dispenser assembly. Moreover, in the example embodiment, the design of the dispenser assembly meets the standards for American Disabilities Act.

When introducing elements of the present disclosure or the embodiment(s) thereof, the articles "a", "an", "the" and "said" are intended to mean that there are one or more of the elements. The terms "comprising", "including" and "having" are intended to be inclusive and mean that there may be additional elements other than the listed elements. Like references in the figures indicate like elements, unless otherwise indicated.

As various changes could be made in the above without departing from the scope of the disclosure, it is intended that all matter contained in the above description and shown in the accompanying drawings shall be interpreted as illustrative and not in a limiting sense.

What is claimed is:

1. A dispenser assembly for dispensing a product, the dispenser assembly comprising:
   a bottle configured to store the product, the bottle comprising a back wall, the back wall comprising:
      a substantially flat surface;
      an angled surface extending outwards from the flat surface; and
      an extension portion extending outwards from the flat surface, the extension portion having a width less than a width of the flat surface; and
   a battery holder, the battery holder comprising:
      a housing; and
      a plurality of batteries contained in the housing,
   wherein the battery holder is positioned adjacent the flat surface of the back wall of the bottle and below the angled surface of the back wall; and
   wherein the housing of the battery holder comprises an intermediate wall separating laterally adjacent batteries, the intermediate wall comprising an angled portion that accommodates the extension portion of the bottle back wall.

2. The dispenser assembly of claim 1, wherein the flat surface extends between a first end and an opposing second end, and wherein the angled surface extends outwards from the flat surface at the first end.

3. The dispenser assembly of claim 2, wherein the extension portion extends outwards from the second end of the flat surface.

4. The dispenser assembly of claim 1, wherein the extension portion extends between two adjacent batteries of the plurality of batteries in the battery holder.

5. The dispenser assembly of claim 1, wherein the bottle has a varying depth to accommodate the battery holder within a housing of the dispenser assembly.

6. The dispenser assembly of claim 1, wherein the bottle further comprises:
   a neck portion;
   a substantially flat top wall; and
   a body portion extending between the neck portion and the top wall, the body portion comprising a front wall, the back wall, and a pair of side walls extending between the front wall and the back wall.

7. The dispenser assembly of claim 1, wherein the angled surface has a length less than a length of the flat surface.

8. A dispenser assembly for dispensing a liquid product, the dispenser assembly comprising:
   a bottle configured to store the product, the bottle comprising a back wall, the back wall comprising:
      a substantially flat surface; and
      an extension portion extending outwards from the flat surface; and
   a battery holder, the battery holder comprising:
      a housing; and
      a plurality of batteries contained in the housing,
   wherein the battery holder is positioned adjacent the flat surface of the back wall of the bottle, and the extension portion extends between adjacent batteries of the plurality of batteries.

9. The dispenser assembly of claim 8, wherein the flat surface includes a first end and an opposing second end, and wherein the extension portion extends outwards from the flat surface at the first end.

10. The dispenser assembly of claim 9, wherein the back wall further comprises an angled surface extending outwards from the second end of the flat surface.

11. The dispenser assembly of claim 10, wherein the angled surface has a length less than a length of the flat surface.

12. The dispenser assembly of claim 8, wherein the back wall further comprises an angled surface extending outwards from the flat surface.

13. The dispenser assembly of claim 12, wherein the battery holder is positioned below the angled surface.

14. The dispenser assembly of claim 12, wherein the angled surface has a length less than a length of the flat surface.

15. The dispenser assembly of claim 8, wherein the bottle has a varying depth to accommodate the battery holder within a housing of the dispenser assembly.

16. The dispenser assembly of claim 8, wherein the bottle further comprises:
   a neck portion;
   a substantially flat top wall; and
   a body portion extending between the neck portion and the top wall, the body portion comprising a front wall, the back wall, and a pair of side walls extending between the front wall and the back wall.

17. The dispenser assembly of claim 8, wherein the extension portion has a width less than a width of the flat surface.

18. The dispenser assembly of claim 8, wherein the housing of the battery holder comprises an intermediate wall separating laterally adjacent batteries, the intermediate wall comprising an angled portion that accommodates the extension portion of the bottle back wall.

* * * * *